United States Patent [19]

Gaus

[11] 4,383,585
[45] May 17, 1983

[54] WEIGHING DEVICE WITH A VIBRATING STRING

[75] Inventor: Harry Gaus, Bensheim, Fed. Rep. of Germany

[73] Assignee: Postalia GmbH, Offenbach am Main, Fed. Rep. of Germany

[21] Appl. No.: 262,797

[22] Filed: May 12, 1981

[30] Foreign Application Priority Data

Jun. 20, 1980 [DE] Fed. Rep. of Germany ....... 3023565

[51] Int. Cl.³ .............................................. G01G 3/14
[52] U.S. Cl. ......................... 177/210 FP; 177/DIG. 5
[58] Field of Search ....... 177/210 R, 210 FP, DIG. 5

[56] References Cited

U.S. PATENT DOCUMENTS

| | | | |
|---|---|---|---|
| 3,712,395 | 1/1973 | Streater et al. ................ | 177/210 FP |
| 3,963,082 | 6/1976 | Meier .............................. | 177/210 FP |
| 4,088,014 | 5/1978 | Wirth et al. ............... | 177/210 FP X |
| 4,163,386 | 8/1979 | Gallo et al. ................ | 177/210 FP X |

FOREIGN PATENT DOCUMENTS 2732052  2/1979  Fed. Rep. of Germany ...... 177/210 FP Primary Examiner—George H. Miller, Jr.
Attorney, Agent, or Firm—Herbert L. Lerner; Laurence A. Greenberg

[57] ABSTRACT

Weighing device, including a load table for supporting a load, a parallel motion system formed of transverse links for moving the load table, a vertical rod for supporting a load on the load table, a cross piece, a vibrating string being suspended from the vertical rod and the cross piece, and four magnet systems being disposed on the vertical rod for exciting the string to vibrations at higher frequency.

8 Claims, 4 Drawing Figures

WEIGHING DEVICE WITH A VIBRATING STRING

The invention relates to a weighing device with a vibrating string, including a parallel motion system formed of transverse links for a load table.

Weighing devices with fixed measuring members in which the resonance frequency is changed by the load are known. Preferably, two strings are used, such as is shown in German Published Non-Prosecuted Application DE-OS No. 20 37 292 and DE-OS No. 25 19 727 and German Patents DE-PS No. 17 74 725, DE-PS No. 17 74 439 and DE-PS No. 25 31 672. These strings are fastened to a frame and the construction differentiates between two strings which are loaded independently of each other and two strings which are pretensioned equally by the load to be measured and a reference load.

The strings are disposed between magnet poles and are made to vibrate at their resonance frequency by current sent through them. The frequencies of the vibrating strings change, depending on the weight placed on the load table. The weighing result is calculated from these frequency changes. Such weighing devices operated with several strings require more effort for evaluation. For example each string requires a frequency counter, comparators and differential counters which can be avoided if only one string is used. String scales with only one vibrating string are also known. In such arrangements, environmental influences such as temperature variations and shocks which could influence the measuring result must be eliminated. For the purpose of damping a stiff measuring system with a relatively high resonance frequency of the string, it is known from German Published Non-Prosecuted Application DE-OS No. 27 30 052 to couple magnet systems to the device taking up the load. Likewise, a magnet system is coupled to a measuring string in order to eliminate temperature influences, as can be gathered from German Published Non-Prosecuted Application DE-OS 22 46 500.

It is accordingly an object of the invention to provide a weighing device with a vibrating string, which overcomes the hereinaforementioned disadvantages of the heretofore-known devices of this general type, and to provide one which is temperature-independent over a large range and is sufficiently damped against shock and vibration.

With the foregoing and other objects in view there is provided, in accordance with the invention, a weighing device, comprising a load table for supporting a load, a parallel motion system formed of transverse links for moving the load table, a vertical rod for supporting or taking up a load on the load table, a cross piece, a vibrating string being suspended from the vertical rod and the cross piece, and four magnet systems being disposed on the vertical rod for exciting the string to vibrations at higher frequency. In accordance with another feature of the invention, there are provided clamping jaws for holding the string, two of the clamping jaws being electrically insulated.

In accordance with a further feature of the invention, there is provided vibration-damping material filled into cavities formed in the vertical roll and cross piece.

In accordance with an added feature of the invention, the transverse links have grooves ground therein.

In accordance with an additional feature of the invention, the grooves formed in the transverse links are disposed substantially parallel to the cross piece.

In accordance with again another feature of the invention, there is provided an overload protection device formed of an adjustable screw threaded in the load table, and the cross piece forming a stop for the screw.

In accordance with again an added feature of the invention, there is provided an outer cage of the scale, and housing nodes formed on the outer cage, the transverse links being fastened to the housing nodes.

In accordance with a concomitant feature of the invention, the string is a stretched ribbon formed of a material used for hair springs for watches. Other features which are considered as characteristic for the invention are set forth in the appended claims.

Although the invention is illustrated and described herein as embodied in a weighing device with a vibrating string, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
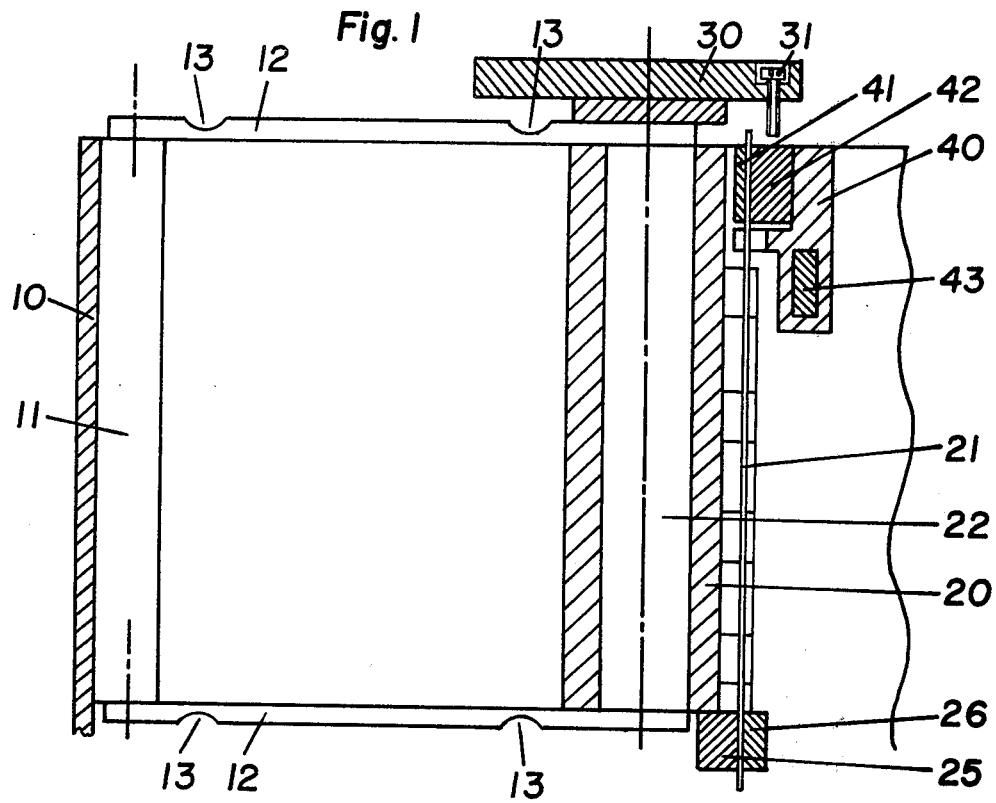
FIG. 1 is a fragmentary diagrammatic side cross-sectional view of the scale of the invention.
Figure 3:
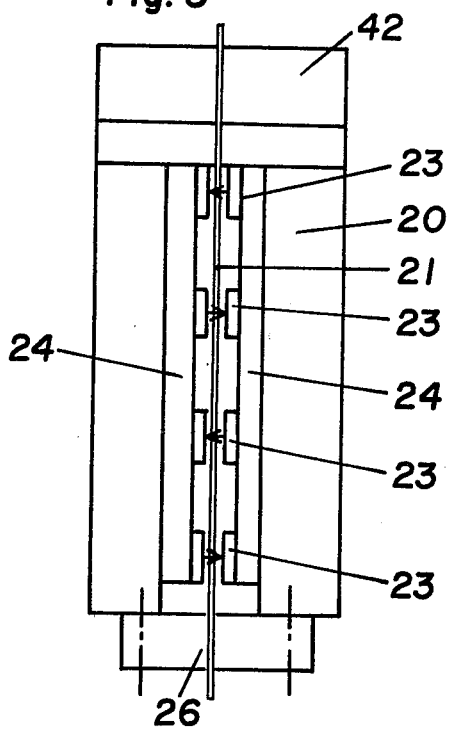
FIG. 3 is an elevational view of the vertical rod.
Figure 4:
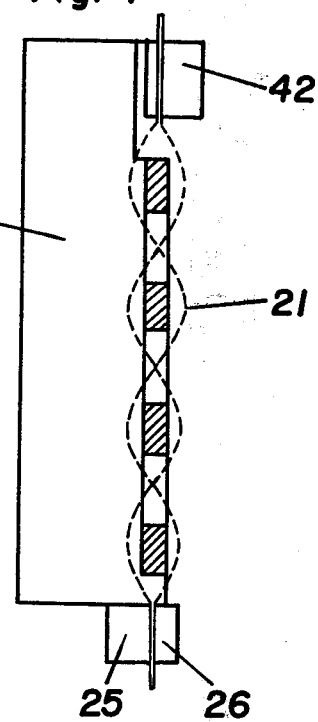
FIG. 4 is a side elevational view of the vertical rod according to FIG. 3, showing the vibration mode of the string.
Figure 2:
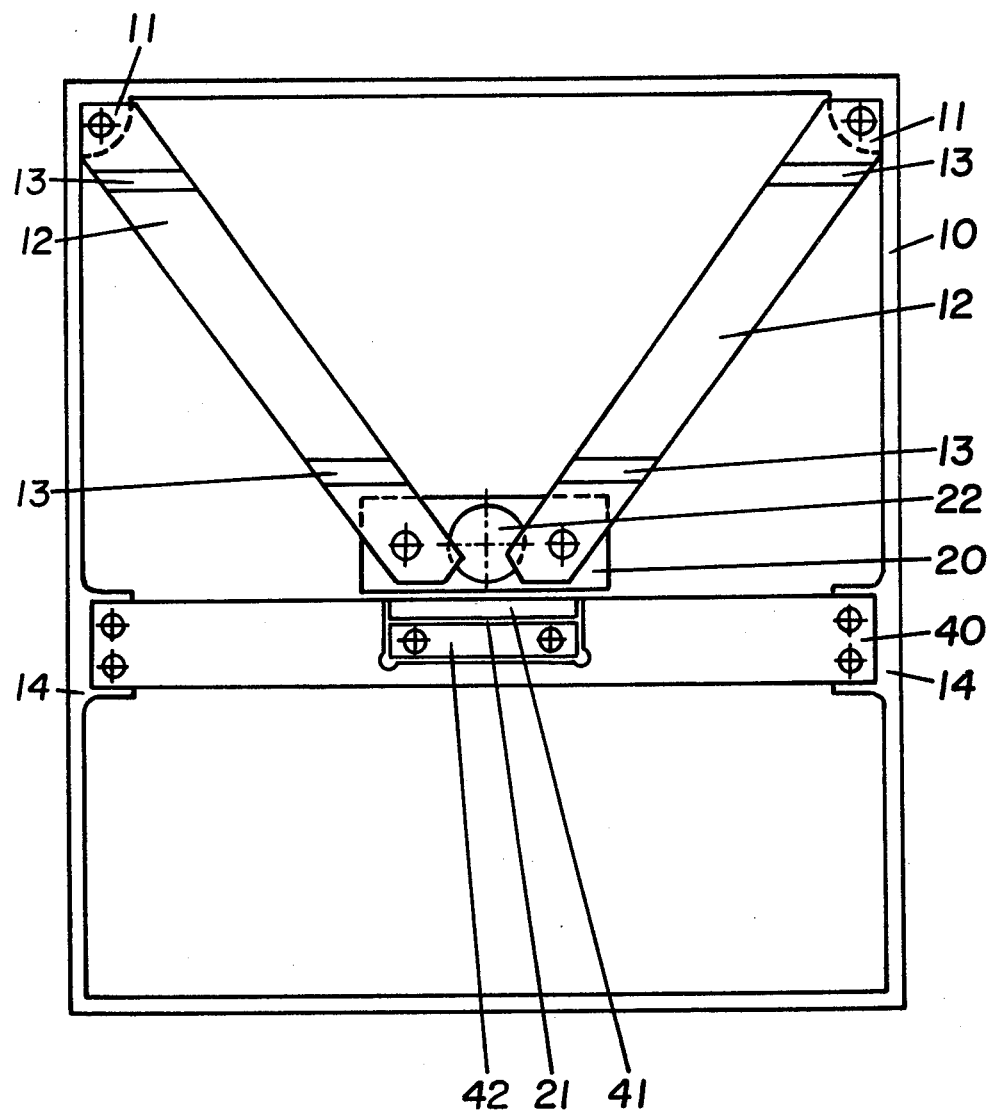
FIG. 2 is a diagrammatic top plane view of the scale with the load table removed.

Referring now to all of the figures of the drawing as a whole, wherein like constructions and parts have the same reference symbols, it is seen that the scale includes an outer cage 10 with reinforcement nodes 11 in the corners, non-illustrated draw slides for the circuit boards of the electronic evaluation and display devices. The housing 10, 11 is preferably made from extruded aluminum stock. The transverse links 12 form a parallel motion system for the vertical rod 20. The links 12 are provided with ground-in grooves 13 in order to obtain sufficient elasticity.

The vertical rod 20 serves for receiving a load table 30 and for the suspension of a string 21 on one side. In order to provide vibration damping, the vertical rod 20 is provided with internal damping. For this purpose, a cavity 22 formed in the vertical rod 20 is filled with a vibration-damping material, such as a plug of plastic. Part of the vertical rod 20 facing the string 21 or chord carries eight permanent magnets 23. The permanent magnets 23 are disposed on two magnetic return iron parts 24 in such a way that they are opposite each other in pairs. The string 21 is disposed between these four magnet systems thus formed. At the lower end of the vertical rod 20, clamping jaws 25, 26 are disposed. The jaws hold the string 21 at its lower end.

At two opposite places the outer cage 10 of the scale has ribs 14 which serve for receiving a cross piece 40 that is fixed in relation to the housing and is suspended in such a way as to be electrically insulated. This cross piece 40 is disposed at right angles to the vertical rod 20 and parallel to the grooves 13 that are ground into the transverse links 12. As in the case of the vertical rod 20, a cavity 43 is formed in the cross piece 40, and is filled with the vibration-damping material. The cross piece 40 carries two clamping jaws 41, 42 which receive the upper end of the string 21.

The cross piece 40 further serves as a stop for an adjustable screw 31 of the load table 30, used as an overload protection.

The string or filament 21 forms part of an electrical bridge circuit, which is not shown. By switching the circuit on, the string 21 is deflected according to the magnetic pole arrangements of the permanent magnets 23 and vibrates transversely at its resonance frequency. The weight of the load changes the frequency, which therefore is a measure for the load. By providing four vibration nodes, using four magnet systems, a higher measuring frequency is obtained. This brings about a shorter measuring time, more acurate measurement, and less sensitivity to external interference fields, such as hum.

The material for the string 21 may be a non-magnetic stressed or stretched ribbon or band, the modules of elasticity of which is constant over a wide temperature range and the elongation of which is fully reversible. It is preferable to use a stretched ribbon such as is employed for hair springs in watches. Naturally, the string may be formed of a number of materials which are subject to deflection by magnetic fields.

There is claimed:

1. Weighing device, comprising a load table for supporting a load, a parallel motion system formed of transverse links for moving said load table, a vertical rod for supporting a load on said load table, a cross piece, a vibrating string being suspended from said vertical rod and said cross piece, and four magnet systems being disposed on said vertical rod for exciting said string to vibrations at higher frequency.

2. Weighing device according to claim 1, including clamping jaws for holding said string, two of said clamping jaws being electrically insulated.

3. Weighing device according to claim 1, including vibration-damping material filled into cavities formed in said vertical rod and cross piece.

4. Weighing device according to claim 1, wherein said transverse links have grooves ground therein.

5. Weighing device according to claim 4, wherein said grooves formed in said transverse links are disposed substantially parellel to said cross piece.

6. Weighing device according to claim 1, including an overload protection device formed of an adjustable screw threaded in said load table, and said cross piece forming a stop for said screw.

7. Weighing device according to claim 1, including an outer cage, and housing nodes formed on said outer cage, said transverse links being fastened to said housing nodes.

8. Weighing device according to claim 1, wherein said string is a stretched ribbon formed of a material used for hair springs for watches.

* * * * *